(12) United States Patent
Dallenbach et al.

(10) Patent No.: US 7,047,818 B2
(45) Date of Patent: May 23, 2006

(54) CAPACITIVE FORCE SENSING DEVICE

(75) Inventors: Willaim David Dallenbach, Sunnyvale, CA (US); Divyasimha Harish, Sunnyvale, CA (US)

(73) Assignee: LoadStar Sensors, Inc., Mountain View, CA (US)

( * ) Notice: Subject to any disclaimer, the term of this patent is extended or adjusted under 35 U.S.C. 154(b) by 45 days.

(21) Appl. No.: 10/823,518

(22) Filed: Apr. 9, 2004

(65) Prior Publication Data

US 2005/0061082 A1    Mar. 24, 2005

Related U.S. Application Data

(60) Provisional application No. 60/461,528, filed on Apr. 9, 2003.

(51) Int. Cl.
*G01B 7/16* (2006.01)

(52) U.S. Cl. ...................................................... 73/780
(58) Field of Classification Search ............... 73/780, 73/862.68, 862.626
See application file for complete search history.

(56) References Cited

U.S. PATENT DOCUMENTS

| | | | | |
|---|---|---|---|---|
| 3,121,328 | A * | 2/1964 | Todd et al. ............ | 73/862.392 |
| 3,668,698 | A * | 6/1972 | Demirdjioghlou et al. .... | 341/33 |
| 4,458,293 | A * | 7/1984 | Cherry .................... | 341/33 |
| 5,553,486 | A * | 9/1996 | Bonin ..................... | 73/105 |
| 6,026,677 | A * | 2/2000 | Bonin ..................... | 73/105 |
| 6,026,694 | A * | 2/2000 | Gray ...................... | 73/862.68 |
| 6,079,282 | A * | 6/2000 | Lanter .................... | 73/862.626 |

\* cited by examiner

*Primary Examiner*—Max Noori

(57) ABSTRACT

An exemplary capacitive force sensing device using metallic springs of certain shapes as spacers between the dielectric plates.

20 Claims, 5 Drawing Sheets

CAPACITIVE FORCE SENSING DEVICE

CLAIM OF PRIORITY

This application claims priority from the provisional application 60/461,528 filed on Apr. 9, 2003 and incorporates said provisional application herein by reference

FIELD OF THE INVENTION

The present invention pertains generally to improvements in the design of a parallel plate capacitive force sensing device solving several of the attendant problems.

BACKGROUND OF THE INVENTION

Capacitive force sensing devices suffer from several constraints which have limited their manufacturability and usefulness in real life applications. These constraints are known respectively as relaxation or creep, hysteresis, set, and off-axis loading.

Hysteresis is another limitation inherent to the use of various springs. When there is a difference in spring deflection at the same applied load—during loading and unloading—the spring is said to have Hysteresis. Hysteresis could come about from set, creep, relaxation and friction. Hysteresis will have the effect of limiting the usefulness of the capacitive force sensing device. Specifically, the spring must consistently and repeatedly return to its original position as the load is applied or removed. Failure to do so will cause erroneous readings.

Figure 1A:
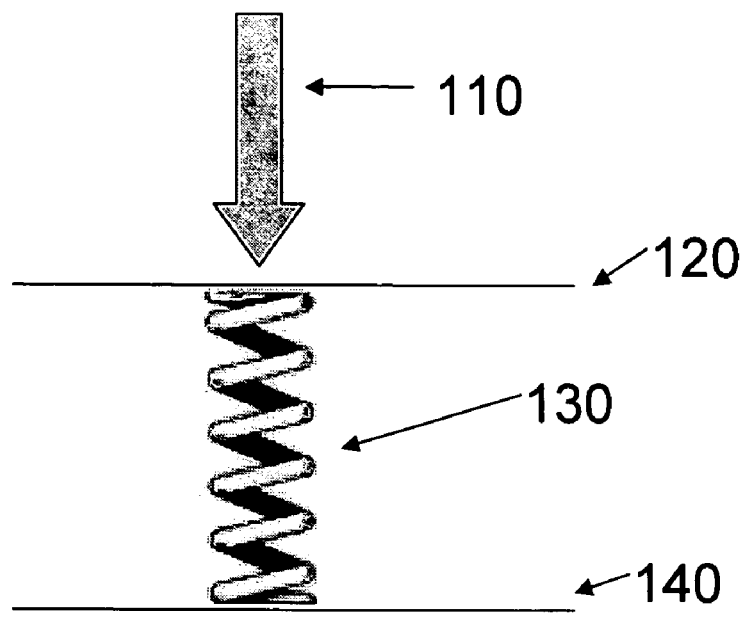
Figure 1B:
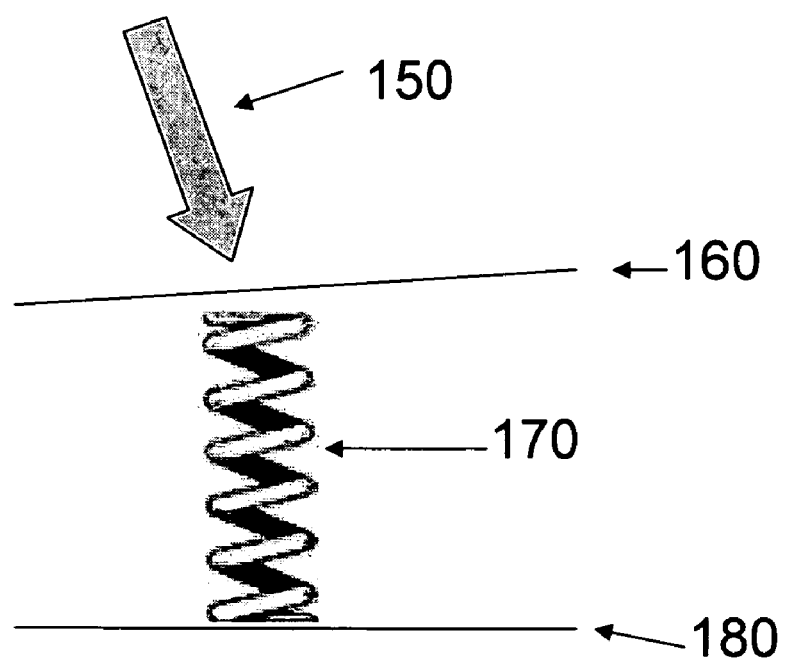

Off-axis loading occurs when the direction of the applied load is not along the initial axis of the sensor. Off-axis loading can cause the capacitive plates to become non-parallel and significantly impact the measured capacitance and hence the load. Referring to FIG. 1, FIG. 1a illustrates an example of off-axis loading. Force 110 is applied to platform 120 and the force then gets transmitted to the compression spring 130. Since force 110 is along the initial axis of the sensor, the two capacitor plates 120 and 140 remain parallel. Referring to FIG. 1b, force 150 is applied in a manner, not along the original axis of the sensors 160 and 180, and not along the original axis of the compression spring 170. Consequently, plate 160 rotates to be perpendicular to the direction of force 150 and is no longer parallel to plate 180.

Many traditional springs such as helical springs or elastomeric springs (made from polymers, i.e. rubber or plastic) tend to suffer from all of the above constraints and consequently require special attention and design changes for building consistently accurate sensors.

SUMMARY

A capacitive force sensing device can be built using two parallel plates separated at a certain distance by an elastic spring. As force is applied, the spring may deflect thus reducing the gap between the parallel plates. A reduction in the gap between the capacitor plates can lead to an increase in capacitance. A capacitance meter can detect the change in capacitance occasioned by the decreased distance between the plates. This change in capacitance can be calibrated precisely for various loads applied and can be used to determine the amount of force applied.

When a constant load is placed on an elastic spring, the observed deflection may not be constant, but rather it could decrease and/or increase gradually with time. This behavior is called respectively, relaxation and/or creep. Upon removal of the load, if the spring does not come back to its original position (before the load was placed), the spring can be said to have "set". These properties, including set, are a result of physical (elastic and/or viscoelastic) and chemical (molecular structure) changes in the spring material. The deformation of the spring may be constant over time, else the force calculation may vary and be unpredictable.

In order to avoid relaxation or creep, hysteresis, set, and off-axis loading, a spring assembly may include a helical spring. In other aspects, a spring assembly which may deflect longitudinally in the direction of an applied force, and may deflect transversely to the direction of the applied force such that the transverse deflection does not touch any portion of the upper surface and the lower surface may be possible.

In several other aspects, the spring assembly may be made of metal, and/or the spring assembly may be perforated. The spring assembly may also be slotted, and/or may include one or more conical washers stacked in various arrangements. Conical washers whose inside edge is thicker than their outside edge (e.g., Belleville washers and/or Belleville springs) may also be used in some aspects.

DETAILED DESCRIPTION OF THE EMBODIMENTS

Figure 2:
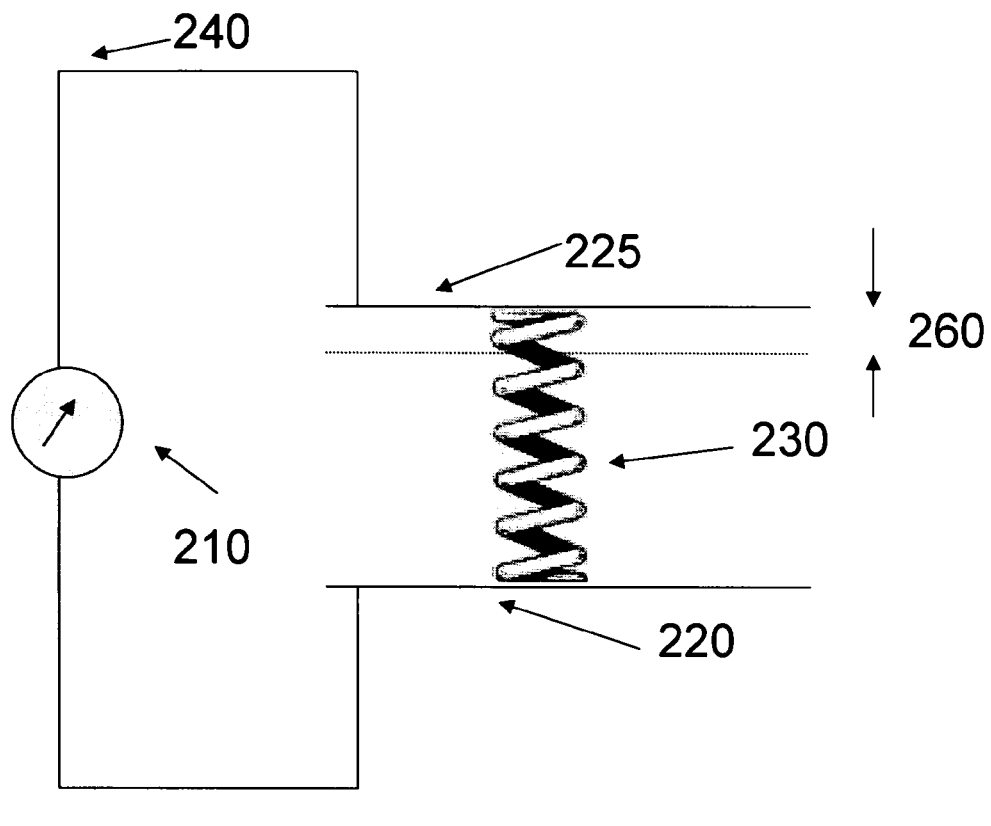
Figure 2:
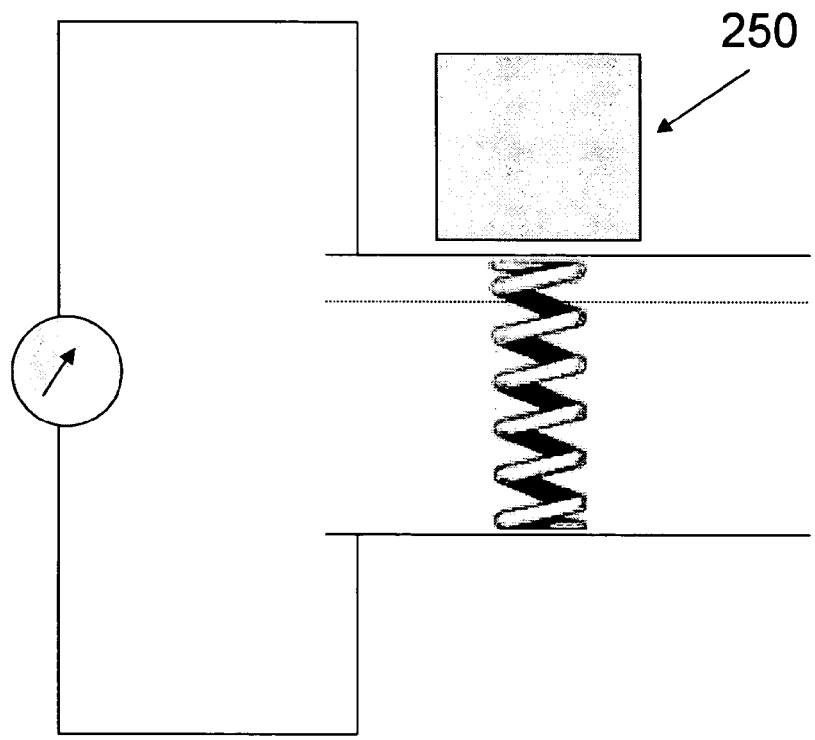

Referring to FIG. 2 one embodiment of a capacitive force sensing device is constructed of a capacitance meter 210, two parallel capacitance plates 220 and 225 separated by a helical spring 230. The capacitance meter is connected via wires 240. Capacitance plate 220 is a fixed base member, whereas capacitance plate 225 is moveable. The force sensing device has a capacitance based upon the area of the dielectric characteristics of the air as well as the volume encompassed by capacitance plates 220 and 225. The basic capacitance formula is:

$$C = kA/d \qquad \text{EQ. 1}$$

Where C represents capacitance, k represents the dielectric of the material(s) between the plate 220 and 225, A represents the area encompassed by the plates, d represents the distance between the capacitance plates 220 and 225.

When an unknown load (i.e. force, weight, pressure, etc.) 250 is applied to capacitance plate 225, the spring contracts by a distance $\Delta d$, shown as 260 in FIG. 2, following the formula:

$$F = k_1 \Delta d \qquad \text{EQ. 2}$$

Where F represents the force applied, $k_1$ represents the characteristic of the spring, and $\Delta d$ represents the amount of deflection. Thus by measuring the capacitance before and after unknown load 250 is applied; the force is easily determined.

Figure 3:
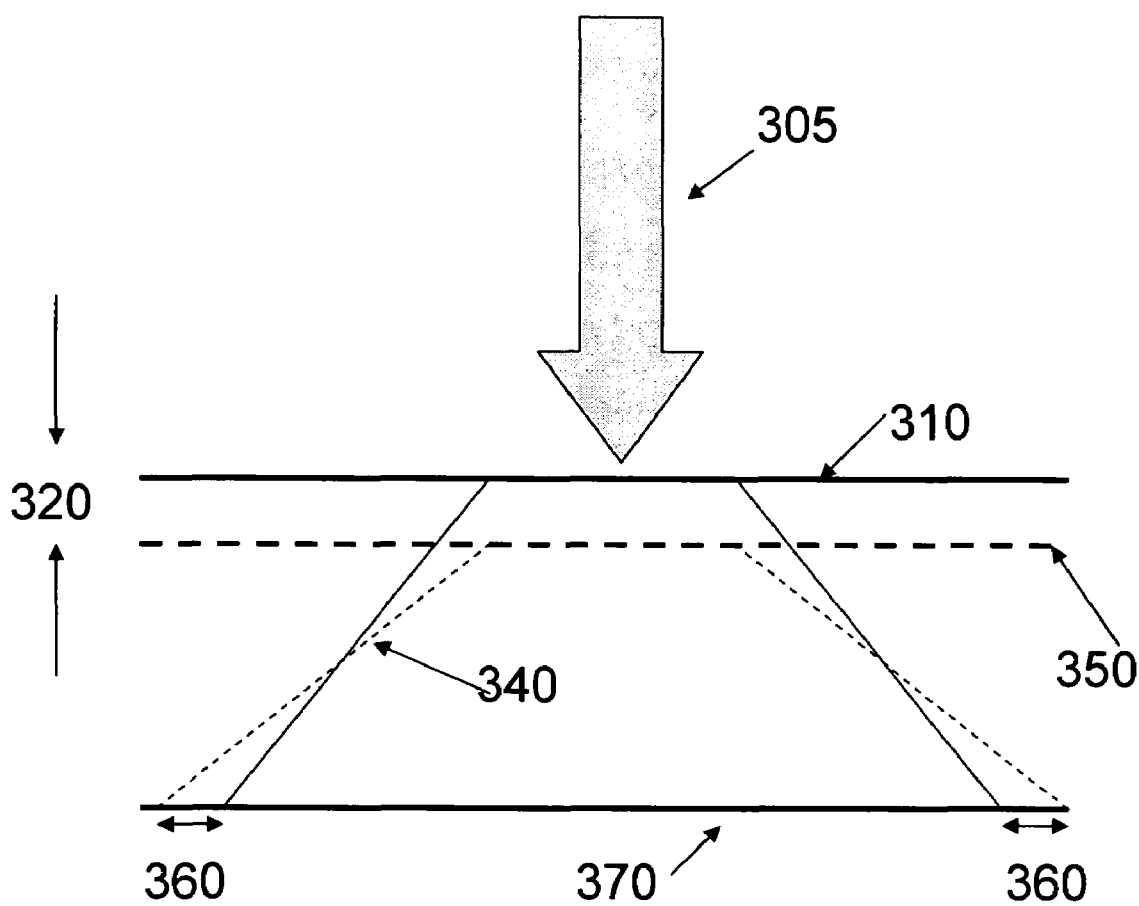

Referring to FIG. 3, in another embodiment of the invention, the invention utilizes hollow conical metal Belleville spring, also known as a cone washer 340 which deflects both longitudinally 320 (along the axis) and transversely 360 (perpendicular to) the direction of unknown load 305. As shown in FIG. 3, the force sensing invention comprising fixed plate 370 and moveable plate 310, is identical, to the force sensing device in FIG. 2, except for cone spring 340. When unknown load 305 is applied to the moveable plate 310, it deflects to the new position 350. The use of the conical spring provides several substantial advantages. The metal Belleville spring has a large base compared to its height combined with a large flat top surface which makes it unlikely that the placed load will cause the capacitive plates to suffer off-axis loading thus becoming non-parallel. Further, metals tend to be less susceptible to set and creep than other materials.

Figure 4:
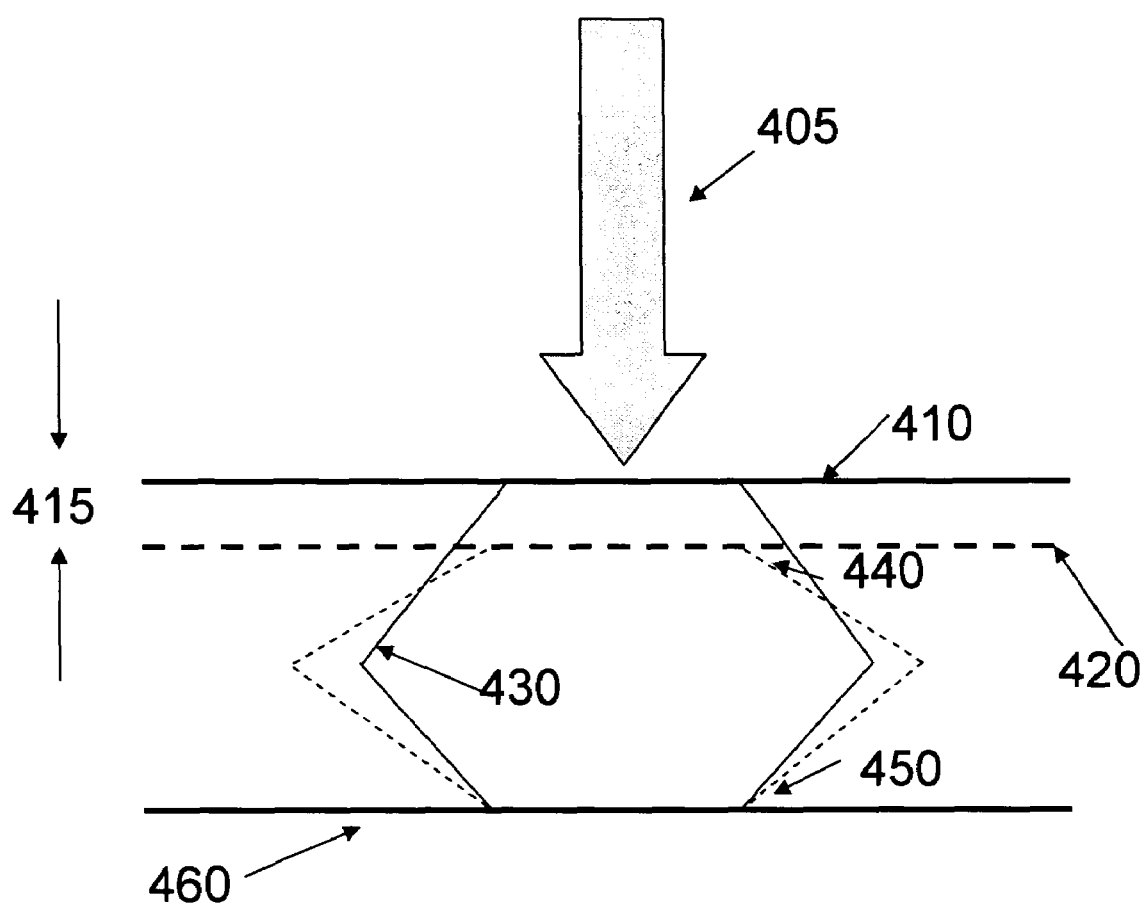

Referring to FIG. 4, the invention replaces the single Belleville spring with a spring whose major characteristics are: the top and bottom surfaces are wide, but not as wide as the middle, that it's deflectable both longitudinally and transversely and the plane of traverse deflection does not connect with (or touch) either of the platforms. As force 405 is placed against capacitive plate 410 it causes longitudinal deflection 415 in spring 430 and the capacitive plate 410 is deflected to the new position 420. However at the points where spring 430 contact capacitive plates 410 and 460, transverse deflection 440 and 450 are negligible which reduces the problem of friction and therefore, hysteresis.

In another embodiment of the invention, the spring is created from Belleville springs placed base to base.

In another embodiment of the invention, the spring is perforated, slotted or combinations thereof.

Figure 5:
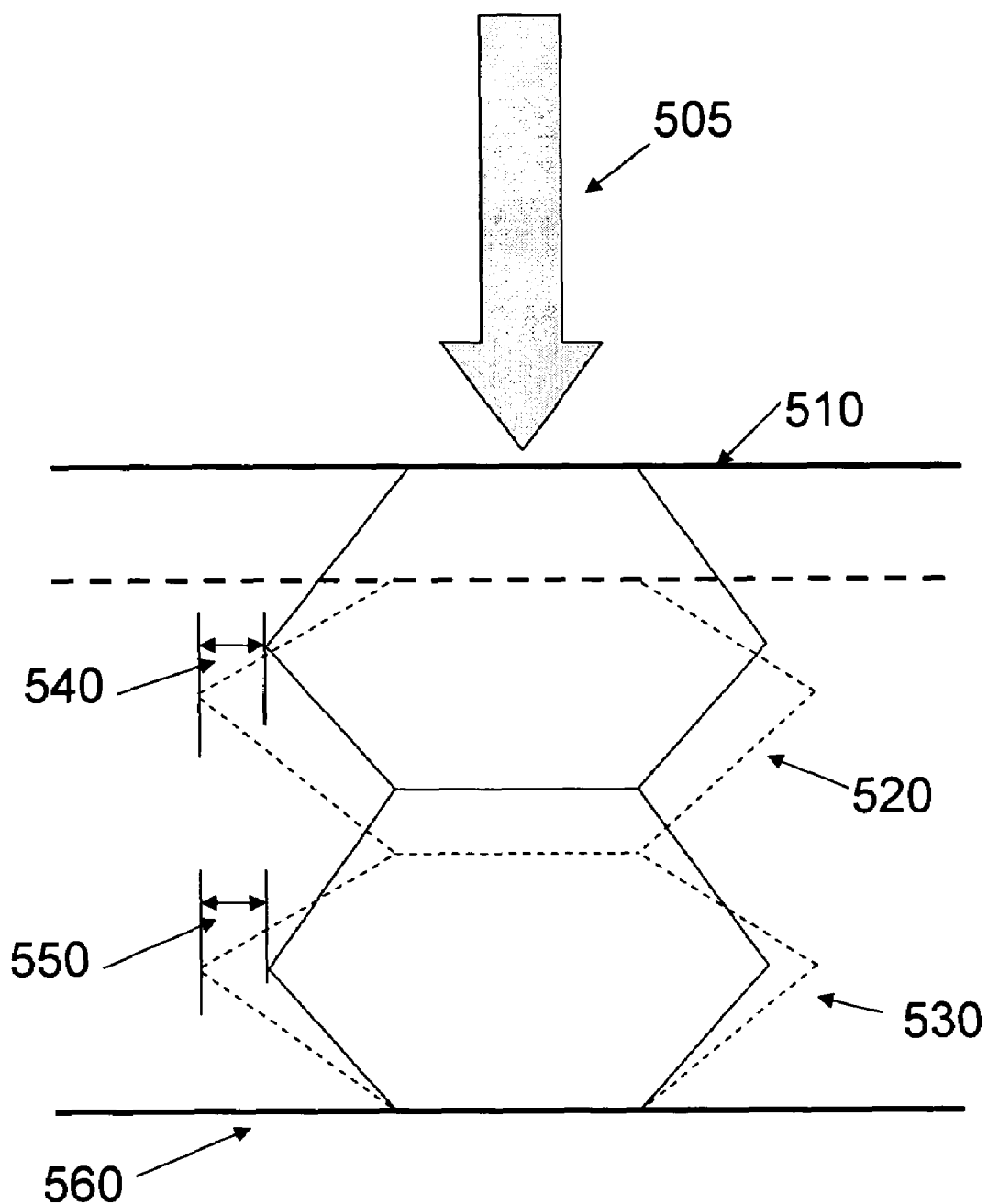

Referring to FIG. 5, in lieu of one pair of base to base Belleville spring; more than one such spring can be used. Force 505 is applied to capacitive plate 510 which causes a deflection in both spring 520 and 530. At the point of contact with each other as well as the capacitive plates 510 and 560, there is almost no transverse deflection. The transverse deflection occurs only at the pointed ends of springs 520 and 530, and are represented marked 540 and 550 respectively.

In another embodiment of the invention, multiple back to back Belleville spring combinations can be utilized between the fixed and moving platforms in order to increase the load measurement capacity.

We claim:

1. An apparatus comprising:
   an upper surface and a lower surface that are substantially parallel to each other, one of the said surfaces being fixed and the other surface being moveable relative to the fixed surface in response to applied force;
   electrodes attached to each of the said upper and lower surfaces;
   a variable capacitor attached to the electrodes which measures the capacitance between the two surfaces;
   electric circuitry to provide an electrical output in response to changed capacitance; and
   a plurality of conical washers stacked to form a spring assembly positioned between the upper surface and the lower surface to form a capacitive force sensing device.

2. An apparatus comprising:
   an upper surface and a lower surface that are substantially parallel to each other, one of the said surfaces being fixed and the other surface being moveable relative to the fixed surface in response to applied force;
   electrodes attached to each of the said upper and lower surfaces;
   a variable capacitor attached to the electrodes which measures the capacitance between the two surfaces;
   electric circuitry to provide an electrical output in response to changed capacitance; and
   a spring assembly which deflects longitudinally in the direction of an applied force, and transversely to the direction of the applied force such that the transverse deflection does not touch any portion of the upper surface and the lower surface; and a plurality of conical washers stacked to form the spring assembly positioned between the upper surface and the lower surface to form a capacitive force sensing device.

3. The apparatus of claim 2 wherein each of the plurality of conical washers having an inside edge that is thicker than an outside edge of each of the plurality of the conical washers.

4. The apparatus of claim 2 further comprising two conical washers placed on top of each other, base to base, to form the spring assembly.

5. The apparatus of claim 2 further comprising multiple base to base conical washers placed on top of each other along the same axis to form the spring assembly.

6. The apparatus of claim 4 where the top surface and the bottom surface of the spring assembly have less width compared to a middle portion of the spring assembly.

7. The apparatus of claim 2 further comprising multiple base to base conical washers placed side by side in the same plane to form the spring assembly.

8. The apparatus of claim 2 where the transverse movement of the conical washers is negligible in the planes where the conical washers are in contact with the lower and upper surfaces and also in the planes where the conical washers are in contact with each other.

9. The apparatus of claim 2 where the spring assembly has a large base compared to its height combined with a large flat top surface.

10. The apparatus of claim 2 where the spring assembly is perforated, slotted, or combination of perforated and slotted.

11. The apparatus of claim 2 where the conical washers are hollow.

12. A method comprising:
   placing a fixed surface and a moveable surface substantially parallel to each other;
   permitting the moveable surface to move in response to a force applied perpendicular to the moveable surface;
   attaching electrodes to both the fixed and the moveable surfaces;
   attaching a variable capacitor which measures the capacitance between the two surfaces;
   positioning a plurality of conical washers stacked to form a spring assembly which deflects longitudinally in the direction of an applied force, and transversely to the direction of the applied force such that the transverse deflection does not touch any portion of the upper surface and the lower surface; and
   measuring the applied force by measuring the capacitance using the variable capacitor.

13. The method of claim 12 wherein each of the plurality of conical washers having an inside edge that is thicker than an outside edge of each of the plurality of the conical washers.

14. The method of claim 12, where the plurality of conical washers are placed on top of each other, base to base.

15. The method of claim 12, where the top surface and the bottom surface of the spring assembly have less width compared to a middle portion of the spring assembly.

16. The method of claim 12, where the plurality of conical washers includes multiple base to base conical washers are placed side by side in the same plane, and where the transverse movement of the conical washers is negligible in the planes where the conical washers are in contact with each other.

17. The apparatus of claim 1, wherein each of the plurality of conical washers having an inside edge that is thicker than an outside edge of each of the plurality of the conical washers, and where the plurality of conical washers are placed on top of each other, base to base.

18. The apparatus of claim 1, where the top surface and the bottom surface of the spring assembly have less width compared to a middle portion of the spring assembly, and where the plurality of conical washers includes multiple base to base conical washers are placed side by side in the same plane.

19. The apparatus of claim 1, where the transverse movement of the conical washers is negligible in the planes where the conical washers are in contact with each other, and where the spring assembly has a large base compared to its height, and a large top flat surface.

20. The apparatus of claim 1, where the spring assembly is at least one of perforated and slotted, and where the conical washers are hollow.

* * * * *